Figure 1:
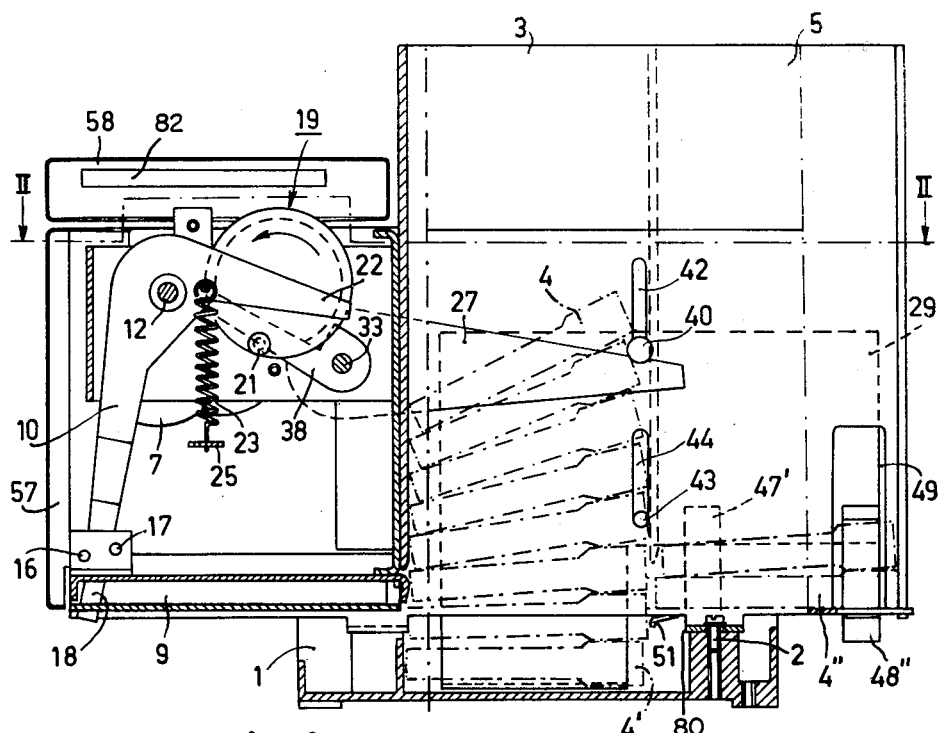

United States Patent [19]

Kok

[11] 4,072,991
[45] Feb. 7, 1978

[54] AUTOMATIC MAGNETIC-TAPE CASSETTE CHANGING DEVICE

[75] Inventor: Cornelis Hendrik Kok, Wassenaar, Netherlands

[73] Assignee: U.S. Philips Corporation, New York, N.Y.

[21] Appl. No.: 633,218

[22] Filed: Nov. 19, 1975

[30] Foreign Application Priority Data

Dec. 2, 1974 Netherlands .......................... 7415667

[51] Int. Cl.² .............................................. G11B 15/68
[52] U.S. Cl. ......................................................... 360/92
[58] Field of Search .......................................... 360/92

[56] References Cited

U.S. PATENT DOCUMENTS 3,646,611  2/1972  Ikeda ...................................... 360/92
3,756,608  9/1973  O'Neill et al. .......................... 360/92
3,886,591  5/1975  Bettini .................................... 360/92

Primary Examiner—Robert S. Tupper
Attorney, Agent, or Firm—Frank R. Trifari; David R. Treacy

[57] ABSTRACT

An automatic magnetic-tape cassette changer with a feed-in magazine and a feed-out magazine for cassettes, in which a cassette pusher pushes the lowermost cassette of the stack in the feed-in magazine underneath the stack of cassettes in the feed-out magazine during the changing cycle. The changer is independent and removable from the tape recorder mechanism, and includes means for lowering the entire feed-in stack to a position for playing or recording the lowest cassette, and raising the entire stack to a position for transferring the cassette just played.

4 Claims, 4 Drawing Figures

AUTOMATIC MAGNETIC-TAPE CASSETTE CHANGING DEVICE

The invention relates to an automatic magnetic-tape cassette changing device with a feed-in magazine for the temporary storage of a stack of cassettes to be fed to a tape recorder (the term tape recorder being used herein to mean an electromagnetic recording and/or playback means as well as magnetic-tape transport) means in the sequence of stacking, a feed-out magazine, which directly ajoins the feed-in magazine, for the temporary storage in the reverse sequence of a number of cassettes moved away from said tape recorder, and a cassette pusher which is drivable by an electric motor with the aid of suitable drive means, which pusher in order to transfer a cassette to the feed-out magazine pushes the lowermost cassette of the stack of cassettes in the feed-in magazine underneath the stack of cassettes in the feed-out magazine.

A changing device of the above-mentioned type is known from U.S. Pat. No. 3,477,726, which device forms part of a tape recorder, at whose rear-top the feed-in and feed-out magazines are disposed, which together constitute one combined magazine in which the two stacks of cassettes adjoin each other. Underneath the bottom of this combined magazine and in the interior of the apparatus the motor and the drive means for the cassette pusher are located, as well as the motor and the tape deck of the recording/playback section.

This known changing device is not suitable for use with tape recorders in which the changing device is not integrated in the apparatus.

An object of the invention is to provide a magnetic-tape cassette changing device which can be used in conjunction with a cassette recording and/or playback apparatus of the type in which no built-in changing device is provided and in which the cassettes must therefore manually and individually be inserted in or removed from the apparatus. In a device according to the invention the two magazines, the electric motor, the drive means and the cassette pusher are part of an automatic cassette changer which is adapted to be mounted on a tape recorder as a separate unit, which in addition to said components comprises first lifting and lowering means, which are drivable by the motor, for lifting or lowering a juxtaposed stack of cassettes temporarily stored in the feed-in magazine respectively between a higher position in which the lowermost cassette is located in front of the cassette pusher, and a lower position in which the lowermost cassette is in the operating position for cooperation with and operative engagement by the tape recording and/or playback apparatus.

In a preferred embodiment of the invention second lifting means are provided for lifting the cassettes present in the feed-out magazine from a lower position to a higher position, which higher position is at least one cassette thickness higher than the corresponding higher position of the lowermost cassette in the feed-in magazine, which has been lifted by the first lifting means. To provide rugged construction and reliable operation of the cassette changer, both lifting means are connected to commonly-operated lifting elements, preferably in the form of sliding plates are disposed at opposed sides of the two magazines and driven by the electric motor. The plates can be moved to and fro between a higher and a lower position in the stacking direction of the cassettes. The first lifting and lowering means comprises cassette carriers which are connected to the sliding plates and which engage the lower surface of the lowermost cassette of the magazine. The second lifting means comprise resiliently bendable hook element which are also connected to the sliding plates, having a bent portion which when the sliding plates are moved to the higher position hooks under the lowermost cassette in the feed-out magazine and thus lifts the stack of cassettes in the feed-out magazine; and when the sliding plates are moved to the lower position the resilient hooks are bent by the cassette which in the meantime has been pushed underneath the stack of cassettes in the feed-out magazine by the cassette pusher, so that the bent portions of the resilient hooks are moved to the lower position along the edges of the underneath cassette.

In a further preferred embodiment the cassette pusher as well as the two sliding plates are driven by the same motor by means of pivotable levers which cooperate with and derive their movements from programming cams arranged on a spindle driven by the motor.

Generally, it will be preferable if the control of the functions of the cassette changer is as far as possible independent of the tape recorder on which the changer is mounted. Upon receipt of an external control pulse, which may for example consist of a control signal which is recorded on the magnetic tape of the cassette which is located in the tape recorder, the changer will be capable of fully independently performing a complete changing cycle if the cassette changer is provided with means for receiving an external control pulse and for the subsequent actuation of the motor, as well as a limit contact which switch off the motor upon termination of the changing cycle.

Figure 2:
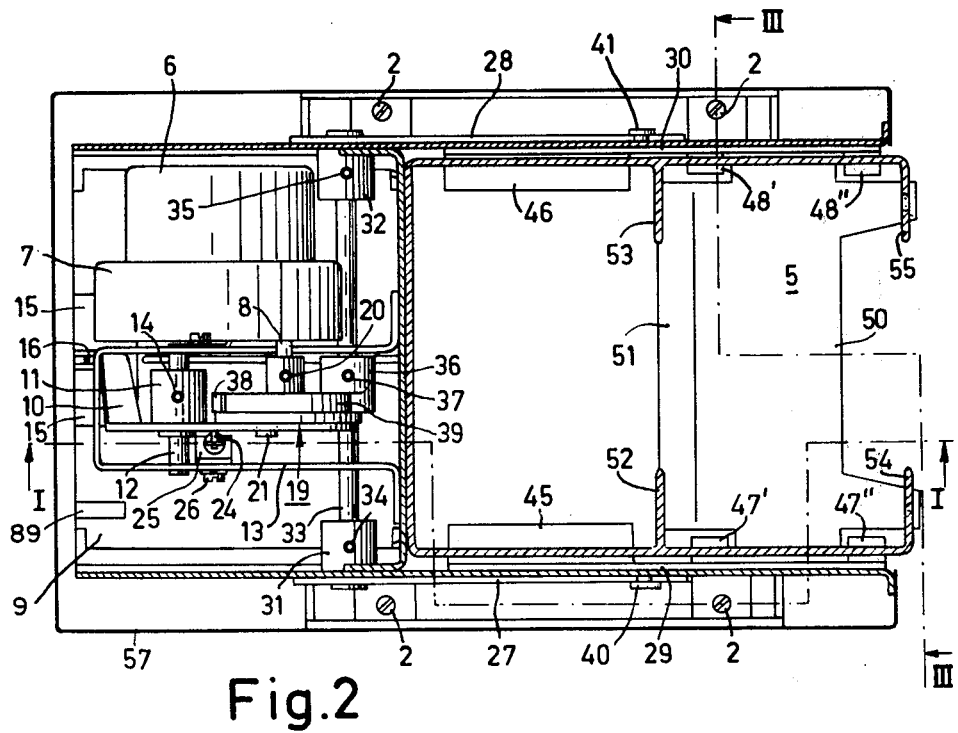
Figure 3:
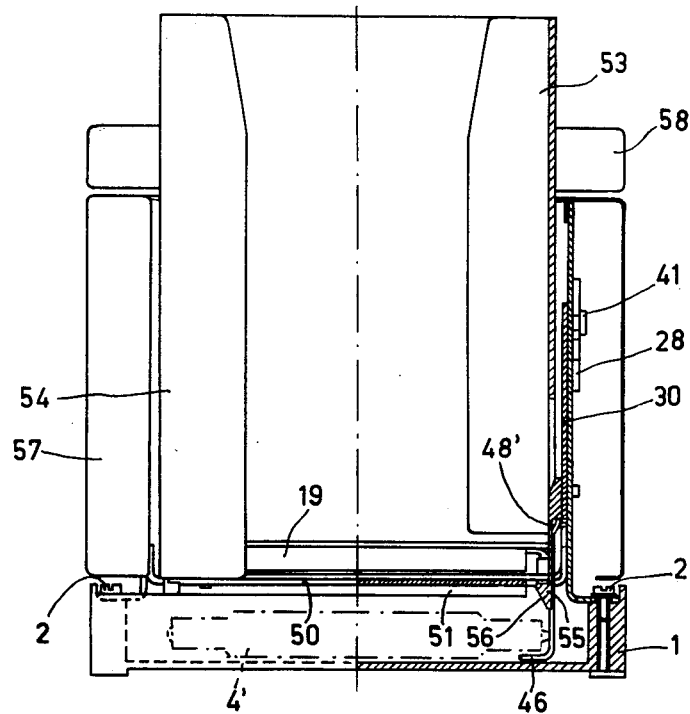
Figure 4:
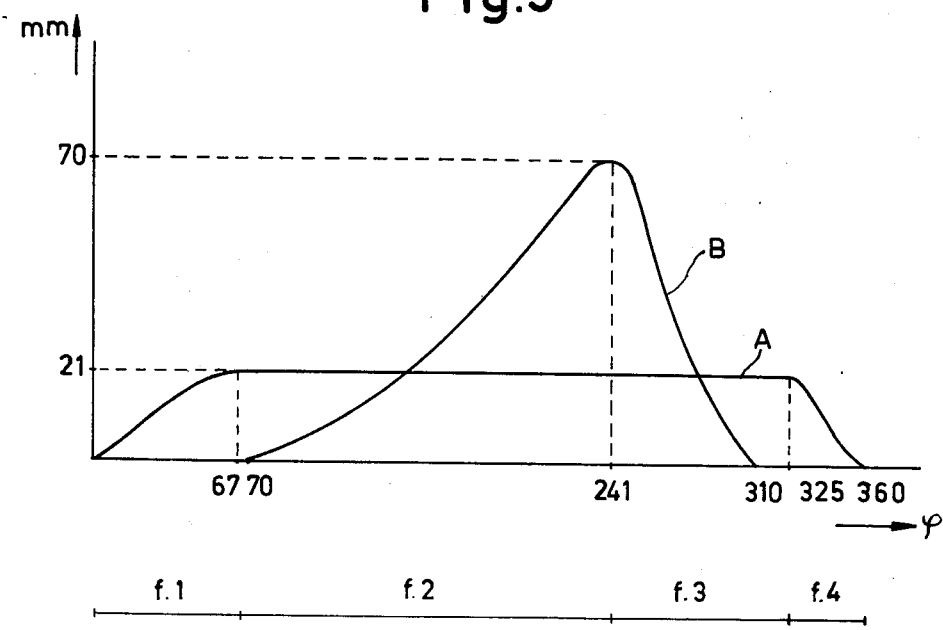

The invention will now be described in more detail with reference to a drawing of an embodiment of the invention, in which drawing:

FIG. 1 is a cross-section of a cassette changer taken at the line I — I in FIG. 2, the position of a number of magnetic-tape cassettes in the magazines being indicated by dashed lines, and the changer being mounted on the upper part of a professional quality tape recorder with four screws, FIG. 2 is a cross-section in accordance with the line II — II in FIG. 1, FIG. 3 is a cross-section in accordance with the line III — III in FIG. 2, and FIG. 4 represents a diagram in which two curves represent the movements (vertical axis) of the lifting mechanism and the cassette pusher in relation to the angle $\phi$ traversed by the programming cam (horizontal axis).

In the Figures the tape recorder on which the changer can be mounted is now shown, as it does not form a part of the invention as such. The FIGS. 1 and 3 only show a part of the frame of a professional cassette recorder, denoted by the reference numeral 1, on which the changer frame 80 is mounted with four screws 2.

The changer comprises a feed-in magazine 3, in which a number of juxtaposed magnetic-tape cassettes 4 can be stored, which are fed to the cassette-recorder in the sequence of stacking. Directly adjoining the feed-in magazine the feed-out magazine 5 is located, in which the cassettes which have already been read or provided with information by the cassette recorder are stacked in a sequence which, from the top to bottom, is opposed to the sequence of feeding to the recorder. The drive mechanism of the cassette changer is located alongside the feed-in magazine. This mechanism comprises an electric motor 6 which is mounted on and drives a reduction gear-box 7 having an output shaft 8. The gear-box 7 reduces the speed of revolution of the motor to that of the output shaft 8.

A cassette pusher 9, which is made of a sheet material and whose width is approximately that of a cassette, is actuated in the following manner: The cassette pusher 9 is driven by a lever 10, which is fastened to a sleeve 11 through which a spindle 12 is passed, which spindle is rotatably journalled in a bracket 13 fastened to the frame 80. With the aid of a locking screw 14 the sleeve 11 and therefore the lever 10 is rigidly connected to the spindle 12. Two hook-shaped bent portions 15 are spot-welded to the cassette pusher 9, between which portions two pins 16 and 17 are mounted, which serve as abutments for the end of the arm 18 of the lever 10. This end is passed between the two pins and can thus move the cassette pusher 9 in a horizontal direction upon rotation of the lever 10 about the spindle 12. On the outgoing spindle 8 of the reduction gear-box 7 a command disc 19 is mounted with the aid of a locking screw 20. An eccentric pin 21 extending from the disk 19 can engage the end of another arm 22 of the lever 10. In the case of a complete changing cycle the command disk 19 makes one full revolution. The pin 21 only contacts the lower end of the arm 22 of the lever 10 during a part of the revolution. By means of a tension spring 23, which at its top is fixed to a pin 24 inserted in the lever 10, the lever is constantly loaded in a clockwise sense. The lower end of the spring 23 is hooked into an opening in an L-shaped bracket 25, which is secured to the bracket 13 with the aid of a screw 26.

In addition to the above-described pusher actuation means the cassette changer includes two levers 27 and 28, also driven by the motor 6, which levers lift the lifting elements formed as sliding plates 29 and 30. The two levers are attached to sleeves 31 and 32 which are slipped onto a spindle 33 and rigidly connected thereto by screws 34 and 35. This spindle is also journalled in the bracket 13. Between the legs of the bracket 13 another lever 38 is rigidly mounted on the spindle 33 with the aid of a sleeve 36 and a locking screw 37, which lever 38 engages a cam 39 of the command disk 19. Near their free ends the two levers 27 and 28 engage the sliding plates 29 and 30 respectively by means of pins 40 and 41 which are connected to said plates, which pins are movable in vertical slots 42 in the side wall of the feed-in magazine 3, as shown in FIG. 1. To keep the plates in alignment, a second pin 43 in each plate projects through a vertical slot 44 below the slot 42. The recess at the side of the pin 40 is denoted by The lifting and lowering means are connected to the two sliding plates. These means consist of cassette carrier elements which are strip-shaped bent portions 45 and 46 of the two sliding plates themselves. They lift and lower the cassettes 4 present in the feed-in magazine 3 between a higher position in which the lowermost cassette, which is denoted by the reference numeral 4', is located in front of the cassette pusher 9 and the lower position, shown in FIG. 1, in which the lowermost cassette 4' is in the operating position for cooperation with the cassette recorder as the plates are moved upwardly and downwardly by action of the levers 27, 28 and the force of gravity. The second lifting means, which are also connected to the slide plates 29 and 30, are formed as resilient hook-shaped elements 47' and 47", and 48' and 48" respectively. These hooks are bendable inwardly and outwardly in wide vertical openings. formed in the side wall of the feed-out magazine 5. The opening 49 in which the lifting means 48" moves is visible in FIG. 1. Simultaneously with the movement of the plates 29, 30 and their bent portions 45, 46, the second lifting means lift the cassettes 4 present in the feed-out magazine from the lower position shown in FIG. 1 to a higher position, which higher position is at least one cassette thickness higher than the corresponding higher position of the lowermost cassette 4' in the feed-in magazine 3, which has been lifted by the first lifting means.

The operation of the cassette changer will now be described in more detail with reference to the diagram of FIG. 4. When starting from the situation shown in FIGS. 1, 2 and 3, in which the cassette carriers 45 and 46 are in the lower position and the lowermost cassette 4' is consequently in the operating position for co-operation with a cassette recorder, the motor 6 will be started upon receipt of a control pulse. via the reduction gear-box 7 the movement of the motor is converted into a rotation of the output shaft 8 and thus of the command disk 19. The cassette changing cycle thus initiated consists of four phases, which in FIG. 4 are denoted as phase $f.1$, phase $f.2$, phase $f.3$ and phase $f.4$. The two curves A and B in FIG. 4 relate to the movements of the two sliding plates 29 and 30 and the cassette pusher 9 respectively. During phase 1, which roughly covers an angle of rotation of 67° of the command disk 19, the cam 39 rotates the lever 38, which results in a lifting movement of the two sliding plates over a distance of 21 mm.

By means of the cassette carriers 45 and 46 the stack of cassettes in the feed-in magazine 3 and by means of the resilient hooks 47', 47" and 48', 48" the stack of cassettes in the feed-out magazine 5 are consequently also lifted over a distance of 21 mm. During the subsequent phase 2 the sliding plates 29 and 30 remain in the position already assumed, while after a rotation of approximately 70° of the command disk 19 the pin 21 comes into contact with the arm 22 of the lever 10, so that the cassette pusher 9 is set into motion. The pusher thereby pushes against and transfers the lowermost cassette 4' of the stack of cassettes 4 in the feed-in magazine 3 which was positioned in front of the cassette pusher 9 towards the feed-out magazine. As the cassettes in the feed-out magazine have been lifted by the resilient hooks 47' through 48" to such a height that the lowermost cassette from the feed-in magazine can be slid underneath the feed-out stack the lowermost cassette from the feed-in magazine will be pushed completely underneath the stack of cassettes in the feed-out magazine as the movement of the cassette pusher proceeds during phase 2, which movement is 70 mm in total. The feed-out magazine 5 has a plate-shaped bottom 50 at its underside, which at its side which faces the feed-in magazine 3 has a bent edge 51 so as to facilitate the transfer of cassettes from the feed-in magazine to the feed-out magazine.

During said transfer the cassettes remaining in the feed-in magazine 3 are retained by two partitions 52 and 53 extending inwardly and vertically between the magazines. In a similar way, the cassette in the feed-out magazine 5 is retained by means of two partitions 54 and 55.

After the command disk 19 has rotated to 241°, the cassette pusher 9 then having reached its maximum travel of 70 mm, phase 3 commences, the plates 29, 30 and the cassettes in the two magazines remaining in their lifted positions and the cassette pusher 9 being returned to its original starting position shown in FIGS. 1 through 3 in an accelerated manner. This position is reached after 310° of rotation of the command disk 19. After 325° rotation phase 4 starts, during which the pin 21 withdraws away from the lever 10 and under the influence of their own weight and the weight of the cassettes disposed on them the two sliding plates 29 and 30 are returned to their positions shown in the drawing, with accompanying rotation of the cam 39 and the lever 38 and the two levers 27 and 28 to the starting position. The resiliently bendable hooks 47′ through 48″ each comprise a bent portion 56, the one on hook 48′ being shown in FIG. 3 which when the sliding plates 29 and 30 are moved to the higher position during phase 1 hooks underneath the lowermost cassette 4″ in the feed-out magazine and thus lifts the stack of cassettes 4 in the feed-out magazine 5. When the sliding plates 29 and 30 are moved to the lower position during phase 4, the resilient hooks 47′ through 48″ are bent outwardly by the cassette which in the meantime has been pushed underneath the stack of cassettes in the feed-out magazine by the cassette pusher 9, so that the bent portions of the resilient hooks are moved to the lower positions along the edges of the cassette which has been slid underneath the stack. When the lower position of the sliding plates is reached the resilient hooks snap back into their initial positions shown in the drawing, thus engaging the underneath cassette.

To protect the changing mechanism a housing 57 made of a sheet material is provided, which at the top is covered by a cover 58 at the location of the motor 6.

The means for starting and stopping the changing cycle may take different forms. For example, a board 82, shown schematically in FIG. 1, provided with printed circuitry and electronic circuit elements may be accommodated in the cassette changer, which elements upon receipt of a starting pulse change over an electromagnetic relay in the power supply circuit of the motor. The pulse may for example be produced by the actuation of a push-button or by a control signal which has been recorded on the magnetic tape in the cassette which is located in the cassette apparatus during operation. The changing cycle can be terminated with the aid of a circuit breaker in the power supply circuit of the motor, which circuit breaker is directly or indirectly actuated by the motor itself. A possibility for this is for example the use of a micro-switch 89 shown schematically in FIG. 2, which is changed over by the cassette pusher 9 upon termination of phase 4 of the changing cycle. Upon receipt of a new starting pulse the micro-switch is temporarily by-passed by the electronic circuit.

What is claimed is:

1. An automatic magnetic tape cassette changing device comprising
   a mounting frame,
   a feed-in magazine for the temporary storage of a juxtaposed stack of cassettes to be fed to a tape recorder in the sequence of stacking, mounted to said frame,
   a feed-out magazine mounted to said frame and arranged directly adjoining the feed-in magazine, for temporary storage in the reverse sequence of a number of cassettes moved away from said tape recorder,
   a cassette pusher,
   means for movably mounting the cassette pusher with respect to said magazine such that said pusher is movable to transfer a lowermost cassette of a stack of cassettes in the feed-in magazine to a position underneath cassettes stacked in the feed-out magazine,
   a drive mechanism arranged for operative movement, and
   means for actuating the cassette pusher in response to movement of the drive mechanism,
   wherein the improvement comprises means for lifting and lowering cassettes present in the feed-in magazine between a lower position in which, said device being mounted on a tape recorder, a lowermost cassette of a stack of juxtaposed cassettes is in the position for operative engagement by the tape recorder, and a higher position in which the lowermost cassette is positioned in line with the cassette pusher, and for lifting juxtaposed cassettes present in the feed-out magazine from a lower position to a higher position, in said higher position a lowermost cassette in said feed-out magazine being disposed at least one cassette thickness higher than a corresponding position of the lowermost cassette in the feed-in magazine when said feed-in magazine has been lifted to its higher position,
   wherein said lifting and lowering means includes:
      a lifting element mounted for motion with respect to said frame between a higher and a lower position in the direction of stacking of the cassettes, and a cassette carrier element connected to said lifting element, and arranged to engage a lower surface of the lowermost cassette in the feed-in magazine, and
      a resilient element connected to the lifting element and having a bent portion so arranged that, upon movement of the feed-out magazine from the lower position to the higher position the lowermost cassette in the feed-out magazine is engaged so as to lift the stack of cassettes in the feed-out magazine; and so connected and arranged that, a cassette having been moved by the pusher member into position underneath the stack of cassettes in the feed-out magazine, upon movement of the lifting element from the higher position to the lower position the resilient element is displaced by said cassette underneath such that the bent portion moves past said cassette underneath to a lower position for engagement with said cassette underneath.

2. A device as claimed in claim 1 wherein said lifting element and said means for actuating said cassette pusher are driven by a same actuating device.

3. A device as claimed in claim 1 comprising means for removably mounting said frame on a tape recorder, and quick-disconnect means for receiving an electrical control pulse from a tape recorder, wherein said actuating device is energized in response to receipt of said control pulse, the device further comprising means for terminating energization of the actuation device upon termination of a changing cycle.

4. A device as claimed in claim 1 comprising two lifting elements formed by sliding plates disposed at opposite sides of the two magazines; at least two cassette carrier elements for engaging the lowermost cassette in the feed-in magazine, each connected to a respective plate; and at least two resilient elements for lifting the feed-out magazine stack, each connected to a respective plate.

* * * * *